United States Patent Office 3,055,884
Patented Sept. 25, 1962

3,055,884
NOVEL NITROGEN CONTAINING STEROIDS
Gerard Nomine, Noisy-le-Sec, Daniel Bertin, Montrouge, and Robert Bucourt, Villiers-le-Bel, France, assignors, by mesne assignments, to Roussel-UCLAF, S.A., Paris, France, a corporation of France
No Drawing. Filed Jan. 19, 1961, Ser. No. 96,339
Claims priority, application France Feb. 5, 1960
14 Claims. (Cl. 260—239.5)

This invention relates to novel nitrogen containing steroids and particularly to compounds having the formula

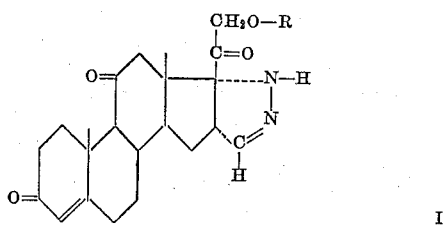

I wherein R is hydrogen or an acyl radical of an organic carboxylic acid having from 1 to 18 carbon atoms. The invention further relates to a novel process for the preparation of compounds of Formula I and novel intermediates thereof.

The novel compounds of Formula I show a marked dissociation of the general effects observed in corticosteroids. They possess a strong anti-inflammatory action and have a greatly reduced glucocorticoidal activity.

It is an object of the invention to obtain novel 21-acyloxy-[$\Delta^{1'(5')}$-pyrazolino-(17$\alpha$,16$\alpha$-C)] - $\Delta^4$ - pregnene-3,11,20-triones.

It is another object of the invention to provide a novel process for the preparation of 21-acyloxy-[$\Delta^{1'(5')}$-pyrazolino-(17$\alpha$,16$\alpha$-C)]-$\Delta^4$-pregnene-3,11,20-triones.

It is a further object of the invention to obtain the following novel intermediates:

(a) 17$\alpha$,21-dibromo-pregnane-3$\alpha$-ol-11,20-dione (III);
(b) 4$\beta$,17$\alpha$,21-tribromo-pregnane-3,11,20-trione (IV);
(c) 21-bromo-$\Delta^{4,16(17)}$-pregnadiene-3,11,20-trione (V);
(d) 21-acetoxy-[$\Delta^{1'}$-pyrazolino-(17$\alpha$,16$\alpha$-C)] - $\Delta^4$ - pregnene-3,11,20-trione (VII).

These and other objects and advantages of the invention will become obvious from the following detailed description.

The process of the invention comprises deacylating 3$\alpha$-acetoxy - 17$\alpha$,21-dibromo-pregnane-11,20-dione (II) to form 17$\alpha$,21-dibromo-pregnane-3$\alpha$-ol-11,20-dione (III), brominating and oxidizing compound III to form 4$\beta$,17$\alpha$,21-tribromo-pregnane-3,11,20-trione (IV), dehydrobrominating compound IV to 21-bromo-$\Delta^{4,16(17)}$-pregnadiene-3,11,20-trione (V), acyloxylating compound V to form 21-acyloxy-$\Delta^{4,16(17)}$-pregnadiene-3,11,20-trione (VI), condensing compound VI with diazomethane to form 21-acyloxy-$\Delta^{1'}$-pyrazolino-(17$\alpha$,16$\alpha$-C) [-$\Delta^4$-pregnene - 3,11, 20-trione (VII) and isomerizing said compound VII to 21 - acyloxy - [$\Delta^{1'(5')}$-pyrazolino-(17$\alpha$,16$\alpha$-C)]-$\Delta^4$-pregnene-3,11,20-trione (I).

A preferred mode of the process comprises deacylating 3$\alpha$-acetoxy-17$\alpha$,21-dibromo-pregnane-11,20-dione by alcohol exchange under acidic conditions such as heating with lower alkanols and mineral acids, preferably sulfuric acid in methanol at reflux temperatures to form 17$\alpha$,21-dibromo-pregnane-3$\alpha$-ol-11,20-dione, brominating and oxidizing the latter with an N-bromo amide in a tertiary lower alkanol such as N-bromo succinimide in tertiary butanol to form 4$\beta$,17$\alpha$-21-tribromo-pregnane-3, 11,20-trione, dehydrobrominating said tribromo compound with a mixture of lithium carbonate and lithium bromide in an N,N-dialkylamide such as dimethyl formamide to form 21-bromo-$\Delta^{4,16(17)}$-pregnadiene-3,11,20-trione, acyloxylating the latter by reaction of an alkali metal salt of the desired acid such as sodium acetate in an N,N-dialkylamide such as dimethyl formamide to form 21-acyloxy-$\Delta^{4,16(17)}$-pregnadiene-3,11,20-trione, condensing the latter with diazomethane in an inert solvent such as methylene chloride to form 21-acyloxy-[$\Delta^{1'}$-pyrazolino-(17$\alpha$,16$\alpha$-C)]-$\Delta^4$-pregnene-3,11,20-trione and isomerizing the latter with an anhydrous strong mineral acid in an inert solvent such as anhydrous hydrogen chloride in methylene chloride followed by neutralization of the acid salt formed with a base such as aqueous sodium bicarbonate to form 21-acyloxy-[$\Delta^{1'(5')}$-pyrazolino-(17$\alpha$,16$\alpha$-C)]-$\Delta^4$-pregnene-3,11,20-trione. The free alcohol may be formed by saponification of the latter with an alkaline base. The process is illustrated in Table I.

TABLE I

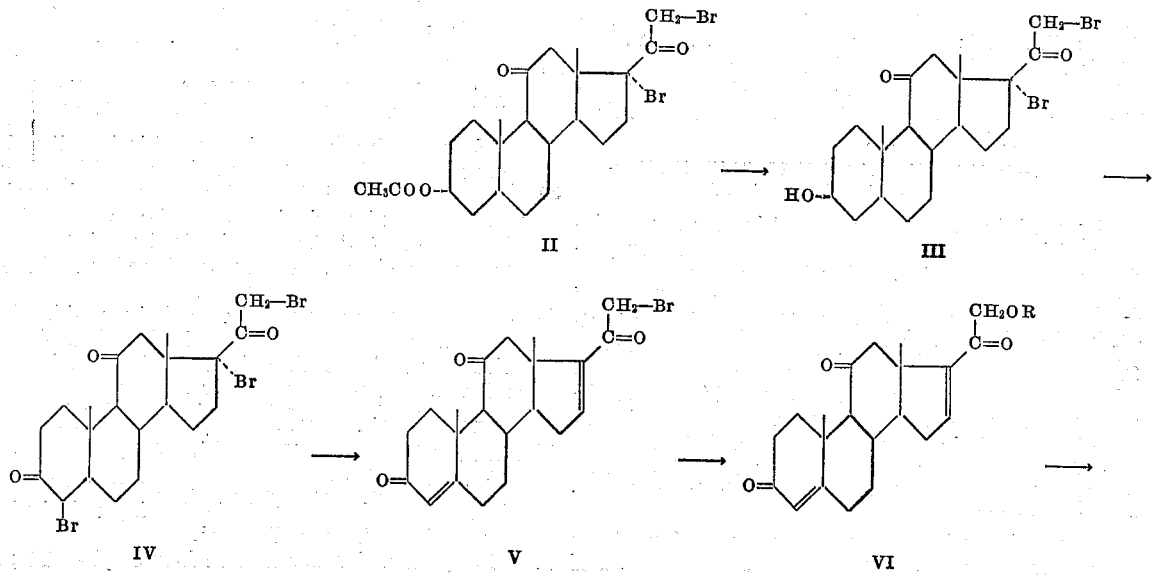

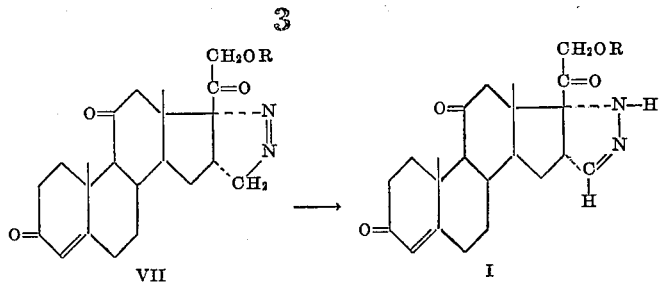

The intermediate, 21-acetoxy-Δ$^{4,16(17)}$-pregnadiene-3,11, 20-trione, can be obtained by the method of McGuckin et al. (J. Am. Chem. Soc., vol. 77, 1955, p. 1822). However, it is preferred to prepare 21-acetoxy-Δ$^{4,16(17)}$-pregnadiene-3,11,20-trione by acetoxylation of 21-bromo-Δ$^{4,16(17)}$-pregnadiene-3,11,20-trione with sodium acetate in dimethyl formamide.

The acyl radical in the 21-position is the acyl radical of an organic carboxylic acid having 1 to 18 carbon atoms. Suitable carboxylic acids are alkanoic and alkenoic acids such as acetic acid, trimethyl acetic acid, propionic acid, butyric acid, 4,4-dimethyl pentanoic acid, undecylenic acid; cycloalkyl alkanoic acid such as β-cyclopentyl propionic acid; arylalkanoic acid such as phenyl propionic acid; cycloalkyl acid such as hexahydrobenzoic acid and hexahydroterephthalic acid; phenyl carboxylic acids such as benzoic acid, 3,5-dinitrobenzoic acid and phthalic acid.

In the following example there are described several preferred embodiments to illustrate the invention. However, it should be understood that the invention is not intended to be limited to the specific embodiments.

Example.—*Preparation of 21-Acetoxy-[Δ$^{1'(5')}$-Pyrazolino-(17α,16α-C)]-Δ$^4$-Pregnene-3,11,20-Trione*

STEP A.—PREPARATION OF 17α,21-DIBROMO-PREGNANE-3α-OL-11,20-DIONE (III)

100 gm. of 3α-acetoxy-17α,21-dibromo-pregnane-11,20-dione (II) were introduced into a solution of 3 cc. of 66° Bé. sulfuric acid in 300 cc. of methanol denatured with benzene and the reaction mixture was carried to reflux under agitation for about four hours. It was cooled under agitation to −10° C., then the crystalline precipitate was vacuum filtered, triturated with ice cold methanol, then with water. The product, 17α,21-dibromo-pregnane-3α-ol-11,20-dione, III, was dried under vacuum.

80 gm. of compound III, being a yield of 87%, were obtained and had a melting point of 190°, $[\alpha]_D^{20}=+2.5°$ (c.=1% in chloroform).

The 17α,21-dibromo-pregnane-3α-ol-11,20-dione was soluble in methylene chloride, soluble in hot methanol, insoluble in water and dilute aqueous acids.

Analysis.—$C_{21}H_{30}O_3Br_2$: molecular weight=490.29. Calculated: C, 51.44%; H, 6.17%; O, 9.79%; Br, 32.6%. Found: C, 51.6%; H, 6.1%; O, 9.6%; Br, 32.4%.

This compound is not described in the literature.

The starting compound, 3α-acetoxy-17α,21-dibromo-pregnane-11,20-dione (II) is described by Engel, J. Am. Chem. Soc. 77, 1064 (1955).

STEP B.—PREPARATION OF 4β,17α,21-TRIBROMO-PREGNANE-3,11,20-TRIONE (IV)

15 gm. of the compound prepared in Step A were introduced into 150 cc. of tertiary butanol and the suspension was heated to 70° C. After the compound dissolved, the temperature was lowered to 45° C. and 12 gm. of N-bromosuccinimide were added while resuming the heating. In about twelve minutes the temperature rose to 59° C. and the N-bromosuccinimide was completely dissolved. After several minutes of agitation, crystallization of the oxide product commences. 7.5 cc. of a solution of 40% hydrobromic acid in water were then added at a temperature of 61° C. and the crystalline product went back into solution. The bromination was effected in 15 to 20 minutes at about 62° C.

The reaction mixture was allowed to cool until the temperature reached room temperature. Then 150 cc. of demineralized water were slowly added and the mixture was agitated for one hour on an ice bath.

The crystalline precipitate was vacuum filtered, washed with water and triturated with absolute ethanol; then with isopropyl ether and dried under vacuum. 16.5 gm., being a yield of 95% of 4β,17α,21-tribromo-pregnane-3, 11,20-trione, were obtained. This compound was used as such for the following step. A pure sample was prepared for analysis by recrystallization from ethyl acetate. Melting point=228°; $[\alpha]_D^{20}=+50°±5$ (c.=0.5% in chloroform). The product was soluble in acetone, benzene and chloroform, soluble in hot ethanol, insoluble in water and ether.

Analysis.—$C_{21}H_{27}O_3Br_3$; molecular weight=567.19. Calculated: C, 44.46%; H, 4.8%; O, 8.46%; Br, 42.27%. Found: C, 44.8%; H, 4.7%; O, 8.8%; Br, 42%.

This compound is not described in the literature.

STEP C.—PREPARATION OF 21-BROMO-Δ$^{4,16(17)}$-PREGNADIENE-3,11,20-TRIONE (V)

5 gm. of anhydrous lithium carbonate and 2.5 gm. of anhydrous lithium bromide were introduced into 50 cc. of dimethyl formamide. The mixture was heated to a temperature of 130° C. and under agitation and under a nitrogen atmosphere, 5 gm. of the compound prepared in Step B were added. After about fifteen minutes, the reaction mixture was rapidly cooled by an ice bath, then 500 cc. of water and 20 cc. of acetic acid were added dropwise. The agitation was continued for two hours while cooling between 0 and +5°.

The product was vacuum filtered, washed with water until no trace of bromide was observed in the wash water and dried under vacuum. 3.48 gm. of 21-bromo-Δ$^{4,16(17)}$-pregnadiene-3,11,20-trione were obtained (yield 97%) which was utilizable as such in the following step. A pure sample was prepared for analysis by recrystallization from methanol and had a melting point of 209–211°. The product was soluble in acetone, methanol and ethyl acetate, soluble in hot ethanol, insoluble in water, ether and cold ethanol.

Ultraviolet spectra: λ max. at 238 mμ, ε=23, 428.

Analysis.—$C_{21}H_{25}O_3Br$; molecular weight=405.33. Calculated: C, 62.22%; H, 6.21%; Br, 19.71%. Found: C, 62.3%; H, 6.3%; Br, 19.9%.

This compound is not described in the literature.

STEP D.—PREPARATION OF 21-ACETOXY-Δ$^{4,16(17)}$-PREGNADIENE-3,11,20-TRIONE (VI, WITH R=ACETYL)

3.3 gm. of the compound prepared in Step C and 1.65 gm. of fused sodium acetate were introduced into 10 cc. of anhydrous dimethyl formamide. The reaction mixture was heated under agitation and under an atmosphere of nitrogen to 65–70° C. and maintained at this temperature for about two hours. It was then allowed to cool to room temperature and 40 cc. of water were added. The precipitated product was extracted several times with ethylene chloride. The extracts were combined, washed with water, dried over sodium sulfate, decolorized with animal black and evaporated to dryness under vacuum.

The oily residue was taken up in ethanol and allowed to stand overnight in a refrigerator. The crystalline precipitate was vacuum filtered, washed with ethanol and dried under vacuum. 1.25 gm. of 21-acetoxy-Δ$^{4,16(17)}$-pregnadiene-3,11,20-trione were obtained, being a yield of 40%. The melting point was 179–182°.

Recrystallization was effected from ethyl acetate; melting point of 183°; [α]$_D^{20}$=+221°±2 (c.=0.5% in chloroform). The product was soluble in acetone, benzene, chloroform and ethyl acetate, soluble in hot ethanol, insoluble in ether.

*Analysis.*—$C_{23}H_{28}O_5$: molecular weight=384.45. Calculated: C, 71.84%; H, 7.34%. Found: C, 72.0%; H, 7.3%.

This compound was identical with the compound obtained by McGuckin et al., J. Am. Chem. Soc., 77, 1822 (1955).

Other esters in the 21-position have been prepared by reacting the compound prepared in Step C with alkaline salt of organic acids such as benzoic and phthalic acids and may be used in place of the 21- acetoxy ester in the following steps.

STEP E.—PREPARATION OF 21-ACETOXY-[Δ$^{1'}$-PYRAZOLINO-(17α,16α-C)]Δ$^4$-PREGNENE-3,11,20-TRIONE (VII, WITH R=ACETYL)

1.2 gm. of the compound prepared in Step D were dissolved in 30 cc. of methylene chloride. There was then introduced into the solution 13.3 cc. of methylene chloride containing 10.9 gm. per liter of diazomethane. The reaction mixture was held for sixteen hours at 0 to +5° C. Then several drops of acetic acid were added in order to destroy the excess of diazomethane. 1 gm. of sodium bicarbonate, magnesium sulfate and animal black were then added and the mixture was filtered. The filtrate was evaporated under vacuum and the gummy residue obtained was taken up in 4 cc. of methylene chloride, then 12 cc. of isopropyl ether. After an hour of crystallization, the crystals were vacuum filtered, washed with the minimum of a mixture of methylene chloride (1 volume) and isopropyl ether (3 volumes) and dried at 40° C. 1.23 gm. of 21 - acetoxy - [Δ$^{1'}$-pyrazolino-(17α,16α C)]-Δ$^4$-pregnene-3,11,20-trione were obtained, being a yield of 93%. It had a melting point of 215° C.; [α]$_D^{20}$=+189° (c.=1% in in chloroform).

The product was recrystallized from ethanol. It was very soluble in methylene chloride, slightly soluble in ethanol, insoluble in water and isopropyl ether.

*Analysis.*—$C_{24}H_{30}O_5N_2$: molecular weight=426.5. Calculated: C, 67.58%; H, 7.09%; N, 6.56%. Found: C, 67.6%; H, 7%; N, 6.9%.

Ultraviolet spectra (ethanol): λ max. 238 mμ, ε=16,800; λ max. 333 mμ, ε=330; inflexion 290 mμ, ε=212.

This compound is not described in the literature.

STEP F.—PREPARATION OF 21-ACETOXY-[Δ$^{1'(5')}$-PYRAZOLINO - (17α,16α - C)] - Δ$^4$ - PREGNENE - 3,11,20-TRIONE (I, WITH R=ACETYL)

1 gm. of the compound prepared in Step E was dissolved in 5 cc. of methylene chloride and 0.25 cc. of ether containing 5.6 gm. of hydrochloric acid per 100 cc. of ether were added. Crystallization was started and then 1.5 cc. of ether containing 5.6 gm. of hydrochloric acid per 100 cc. of ether were added anew under agitation. The precipitate obtained was the hydrochloride of 21-acetoxy-[Δ$^{1'(5')}$ - pyrazolino - (17α,16α-C)]-Δ$^4$-pregnene-3,11,20-trione. It was vacuum filtered, washed with methylene chloride and placed in suspension in 20 cc. of methylene chloride. 10 cc. of a saturated solution of sodium bicarbonate were then introduced under agitation. The organic phase was separated, washed with water until the wash water was neutral, dried over magnesium sulfate and evaporated to dryness under vacuum.

The product was recrystallized from ethyl acetate. 655 mg. of 21-acetoxy-[Δ$^{1'(5')}$-pyrazolino-(17α,16α-C)]-Δ$^4$-pregnene-3,11,20-trione were obtained, being a yield of 65.5%. It had a melting point of 188° C.; [α]$_D^{20}$=+392°±2 (c.=1% in chloroform).

It was very soluble in methylene chloride, slightly soluble in ethyl acetate, insoluble in ether.

*Analysis.*—$C_{24}H_{30}O_5N_2$: molecular weight=426.5. Calculated: C, 67.58%; H, 7.09%; N, 6.56%. Found: C, 67.5%; H, 7%; N, 6.9%.

Ultraviolet spectra (ethanol): λ max.=238 mμ, ε= 18,950; λ max.=304 mμ, ε=480.

This compound is not described in the literature.

By saponification of the above compound with an alkaline base, [Δ$^{1'(5')}$-pyrazolino-(17α,16α - C)]-Δ$^4$-pregnene-21-ol-3,11,20-trione was obtained.

Various modifications of the process of the present invention may be made without departing from the scope or spirit thereof, and it is to be understood that the invention is not intended to be limited to the specific embodiments.

We claim:
1. Compounds having the formula

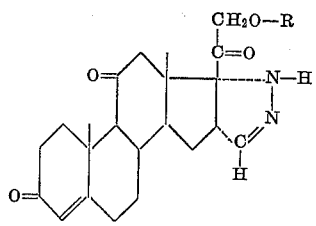

wherein R is selected from the group consisting of hydrogen and an acyl radical of an hydrocarbon carboxylic acid having 1 to 18 carbon atoms.

2. 21 - acetoxy - [Δ$^{1'(5')}$ - pyrazolino-(17α,16α-C)]-Δ$^4$-pregnene-3,11,20-trione.

3. [Δ$^{1'(5')}$-pyrazolino-(17α,16α-C)]-Δ$^4$-pregnene-21-ol-3,11,20-trione.

4. 4β,17α,21-tribromo-pregnane-3,11,20-trione.

5. 21-bromo-Δ$^{4,16(17)}$-pregnadiene-3,11,20-trione.

6. A process for the preparation of compounds having the formula

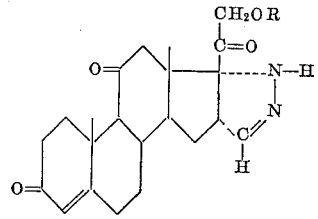

wherein R is selected from the group consisting of hydrogen and acyl radical of an hydrocarbon carboxylic acid having 1 to 18 carbon atoms which comprises diacetylating 3α-acetoxy-17α,21-dibromo-pregnane-11,20-dione under acidic conditions to form 17α,21-dibromo-pregnane-3α-ol-11,20-dione, brominating and oxidizing the latter to form 4β,17α,21-tribromo-pregnane-3,11,20-trione, dehydrobrominating said tribromo product to form 21-bromo-Δ$^{4,16(17)}$-pregnadiene-3,11,20-trione, acyloxylating the latter with a salt of an organic carboxylic acid having 1 to 18 carbon atoms to form 21-acyloxy-Δ$^{4,16(17)}$-pregnadiene-3,11,20-trione, condensing the said acyloxylated product with diazomethane to form 21-acyloxy-[Δ$^{1'}$-pyrazolino - (17α,16α-C)] - Δ$^4$ - pregnene - 3,11,20 - trione, isomerizing the latter with a strong mineral acid in an organic solvent followed by treating with a base to form 21-acyloxy - [Δ$^{1'(5')}$ - pyrazolino - (17α,16α - C)] - Δ$^4$ - pregnene-3,11,20-trione and recovering the compound of the above formula.

7. The process of claim 6 wherein the deacetylation is effected with sulfuric acid in methanol under reflux.

8. The process of claim 6 wherein the bromination and oxidation is effected with N-bromosuccinimide in tertiary butanol.

9. The process of claim 6 wherein the dehydrobromination is effected with a mixture of lithium carbonate and lithium bromide in dimethyl formamide.

10. The process of claim 6 wherein the acylation is effected with sodium acetate in dimethyl formamide.

11. The process of claim 6 wherein the condensation with diazomethane is conducted in methylene chloride.

12. The process of claim 6 wherein the isomerization is effected with hydrogen chloride in methylene chloride and subsequently treated with sodium bicarbonate in methylene chloride.

13. A process for the preparation of compounds having the formula

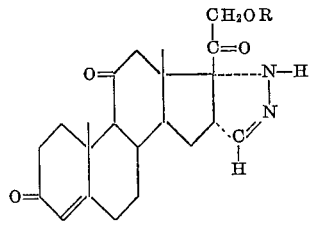

wherein R is selected from the group consisting of hydrogen and an acyl radical of an hydrocarbon carboxylic acid which comprises deacetylating 3α-acetoxy-17α,21-dibromo-pregnene-11,20-dione with sulfuric acid in methanol at reflux to form 17α,21-dibromo-pregnene-3α-ol-11,20-dione, reacting the latter with N-bromosuccinimide in tertiary butanol to form 4β,17α,21-tribromo-pregnane-3,11,20-trione, dehydrobrominating the tribromo product with a mixture of lithium carbonate and lithium bromide in dimethyl formamide to form 21-bromo-$\Delta^{4,16(17)}$-pregnadiene-3,11,20-trione, acyloxylating the latter with the sodium salt of an organic carboxylic acid having 1 to 18 carbon atoms to form 21-acyloxy-$\Delta^{4,16(17)}$-pregnadiene-3,11,20-trione, condensing the acyloxylated product with diazomethane in methylene chloride to form 21 - acyloxy - [$\Delta^{1'}$ - pyrazolino - (17α,16α - C)] - $\Delta^4$ - pregnene-3,11,20-trione, isomerizing the latter with hydrogen chloride in methylene chloride followed by treatment with sodium bicarbonate to form 21-acyloxy-[$\Delta^{1'(5')}$-pyrazolino-(17α,16α-C)]-$\Delta^4$-pregnene-3,11,20-trione and recovering the compound of the above formula.

14. A process for the preparation of compounds having the formula

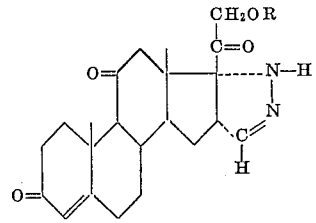

wherein R is selected from the group consisting of hydrogen and acetoxy groups which comprises condensing 21-acetoxy-$\Delta^{4,16(17)}$-pregnadiene-3,11,20-trione with diazomethane to form 21-acetoxy-[$\Delta^{1'}$-pyrazolino-(17α,-16α-C)]-$\Delta^4$-pregnene-3,11,20-trione, isomerizing the latter with a strong mineral acid in an inert organic solvent followed by treating with an alkali metal carbonate to form 21 - acetoxy - [$\Delta^{1'(5')}$ - pyrazolino - (17α,16α-C)]-$\Delta^4$-pregnene-3,11,20-trione and recovering the compound of the above formula.

References Cited in the file of this patent
UNITED STATES PATENTS 3,013,034    Sletzinger et al. _____ Dec. 12, 1961

OTHER REFERENCES

Merck: Derwent Belgian Report No. 53A, April 1959, page C17.

Engel et al.: Canadian Journal of Chemistry, vol. 38 (1960), page 1203.